(12) United States Patent
Donnelly et al.

(10) Patent No.: US 7,043,534 B1
(45) Date of Patent: May 9, 2006

(54) REMOTE EXECUTION OF COMMANDS IN A MULTI-HOST NETWORK

(75) Inventors: James Aloysius Donnelly, Austin, TX (US); George Kraft, IV, Austin, TX (US)

(73) Assignee: Lenavo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 09/539,848

(22) Filed: Mar. 31, 2000

(51) Int. Cl.
*G06F 15/16* (2006.01)
*G06F 15/167* (2006.01)

(52) U.S. Cl. ............... 709/217; 709/203; 709/216; 709/227; 709/236; 709/208

(58) Field of Classification Search ........... 709/201, 709/205, 203, 202, 204, 329, 218, 217, 208, 709/227, 236, 216; 345/700, 744, 504
See application file for complete search history.

(56) References Cited

U.S. PATENT DOCUMENTS

| | | | | |
|---|---|---|---|---|
| 5,313,581 A * | 5/1994 | Giokas et al. | ............... | 709/329 |
| 5,392,400 A * | 2/1995 | Berkowitz et al. | .......... | 709/203 |
| 5,408,602 A * | 4/1995 | Giokas et al. | ............... | 345/733 |
| 5,519,833 A * | 5/1996 | Agranat et al. | ............. | 709/231 |
| 5,748,894 A * | 5/1998 | Ishizaki et al. | ............. | 709/202 |
| 5,781,727 A * | 7/1998 | Carleton et al. | ............ | 709/205 |
| 5,819,038 A * | 10/1998 | Carleton et al. | ............ | 709/204 |
| 5,889,946 A * | 3/1999 | FitzPatrick et al. | ......... | 709/205 |
| 5,893,053 A * | 4/1999 | Trueblood | .................. | 702/187 |
| 5,944,791 A * | 8/1999 | Scherpbier | .................. | 709/218 |
| 5,948,022 A * | 9/1999 | Carleton et al. | ............ | 700/204 |
| 6,131,183 A * | 10/2000 | Tyler | .......................... | 717/106 |
| 6,151,621 A * | 11/2000 | Colyer et al. | ............... | 709/204 |
| 6,249,294 B1 * | 6/2001 | Lefebvre et al. | ............ | 345/504 |
| 6,362,836 B1 * | 3/2002 | Shaw et al. | .................. | 345/744 |
| 6,374,287 B1 * | 4/2002 | Goldstein | .................... | 709/201 |
| 2002/0138627 A1 * | 9/2002 | Frantzen et al. | ............ | 709/227 |

* cited by examiner

*Primary Examiner*—Bunjob Jaroenchonwanit
*Assistant Examiner*—Ramsey Refai
(74) *Attorney, Agent, or Firm*—Joseph P. Lally

(57) ABSTRACT

A multi-host data processing network and associated method are disclosed. The network includes a local host, a remote host, and a terminal including a display, a keyboard, and a pointing device. A display server associated with a user of the terminal is present on the local host. The display server enables the user to execute GUI applications on local and remote hosts from the terminal via a display server authorization mechanism. The network is configured to enable the user to execute a command entered at the terminal on the remote host using the display server as an intermediary. In one embodiment, the local host includes a client application and the remote host includes a daemon process, wherein the client application is enabled to receive the command from the user and the daemon process is configured to retrieve and execute the command. The daemon process may be configured to monitor changes to a special purpose property of the display server and the client application may be configured to alter the special purpose display server property upon receiving the command from the user. The daemon process may be configured to open a display server window and to store a window id of the display server window as the value of the display server property. The client application may be configured to change the display server property to zero or another suitable value upon receiving the command. The client application may be enabled to transfer the command to a clipboard associated with the display server window. The daemon process may be enabled to retrieve the command from the clipboard upon detecting a change to the special purpose display server property.

17 Claims, 3 Drawing Sheets

REMOTE EXECUTION OF COMMANDS IN A MULTI-HOST NETWORK

BACKGROUND

1. Field of the Present Invention

The present invention generally relates to the field of data processing networks and more particularly to a network windowing system and method enabling a user to execute commands on a remote host.

2. History of Related Art

In a heterogeneous UNIX® (registered trademark of Unix System Laboratories, Inc.) operating system environment, it is frequently necessary or desirable to run an application that resides on a remote host from a local host. Typically, however, authorization mechanisms permitting access to the remote machine are an impediment to executing commands remotely. In a common arrangement of a multi-hosted UNIX® based network, local and remote hosts are interconnected via a network. Various systems such as the X Window System provide utilities that enable a user to manipulate local and remote graphical user interface (GUI) applications, but these systems do not currently incorporate the ability to execute command strings on remote machines. It would therefore be desirable to implement a system that enabled a user to execute command strings on remote machines. It would be further desirable if the implemented solution leveraged from existing systems to the greatest extent possible and did not require substantial programming modifications.

SUMMARY OF THE INVENTION

The problem identified above is addressed by a multi-host data processing network and associated method. The network includes a local host, a remote host, and a terminal including a display, a keyboard, and a pointing device. A display server associated with a user of the terminal is present on the local host. The display server enables the user to execute GUI applications on local and remote hosts from the terminal via a display server authorization mechanism. The network is configured to enable the user to execute a command entered at the terminal on the remote host using the display server as an intermediary. In one embodiment, the local host includes a client application and the remote host includes a daemon process, where the client application is enabled to receive the command from the user and the daemon process is configured to retrieve and execute the command. The daemon process may be configured to monitor changes to a special purpose property of the display server and the client application may be configured to alter the special purpose display server property upon receiving the command from the user. The daemon process may be configured to open a display server window and to store a window id of the display server window as the value of the display server property. The client application may be configured to change the display server property to zero or another suitable value upon receiving the command. The client application may be enabled to transfer the command to a clipboard associated with the display server window. The daemon process may be enabled to retrieve the command from the clipboard upon detecting a change to the special purpose display server property.

BRIEF DESCRIPTION OF THE DRAWINGS

Other objects and advantages of the invention will become apparent upon reading the following detailed description and upon reference to the accompanying drawings in which.

Figure 1:
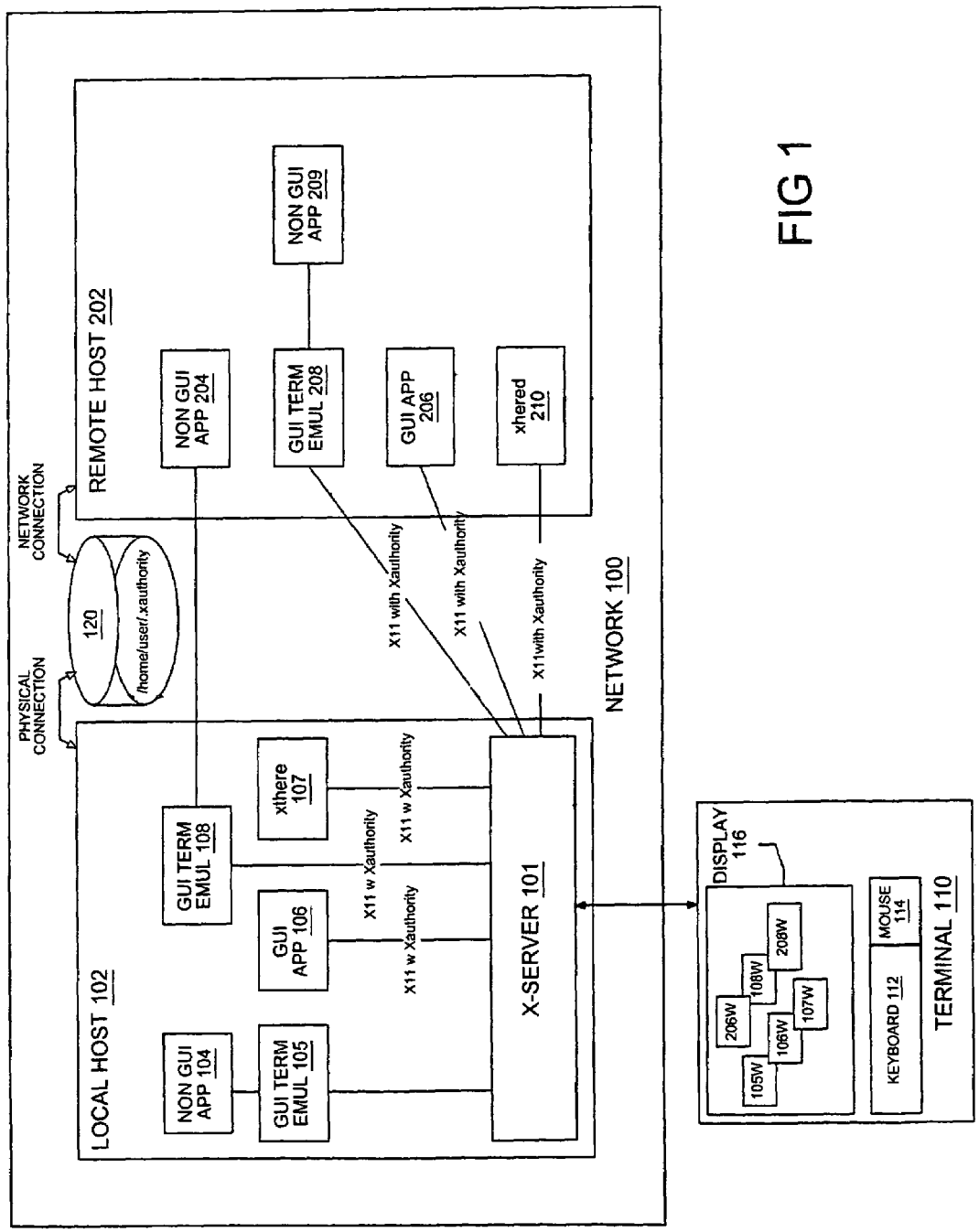
FIG. 1 is a diagram of a multi-host data processing network according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE DRAWINGS

Turning now to the drawings, FIG. 1 illustrates a data processing network 100 suitable for implementing the present invention. In the depicted embodiment, network 100 includes a local host 102, a remote host 202, and terminal 110. Terminal 110 includes a keyboard 112, a mouse 114, and a display 116. Terminal 110 is connected to a display server 101. For purposes of this disclosure, a display server refers to a server program that runs on the network's operating system and provides a graphical user interface (GUI) of the host's desktop to a user of terminal 110. Thus, display server 101 is associated with a particular user of network 100. In one embodiment, display server 101 is implemented as an X Server of an X Window System running on an UNIX® based operating system. The X Window System is a windowing system that permits a GUI application program running on local host 102 or remote host 202 to open and interact with a window that is displayed on the display 116 of terminal 110. In the X Window System, the program opening and interacting with the window is the "client" and the X Server is the program executing on the host to which terminal 110 is connected. X Server 101 is responsible for displaying a window for each GUI application to which the X Server 101 is connected on display terminal 116. X Server 101 receives window update messages from its client programs and makes the requested updates to the respective windows on display 116 of terminal 110. In addition, X Server 101 routes input associated with the any of the displayed windows to the corresponding client program. Thus, X Server 101 provides a software interface between a window on display 110 and the client program corresponding to the window. A complete source listing of version 11 of the X Window System (X11) is available from X.Org at http://www.x.org and is incorporated by reference herein. Additional X Window System documentation is available in T. O'Reilly, *X Window System Administrator's Guide*, (O'Reilly & Associates, 1992) and A. Nye, *Xlib Programming Manual*, (O'Reilly & Associates 1992), both of which are incorporated by reference herein.

As depicted in FIG. 1, X Server 101 is connected to several GUI applications or clients. Each of these clients is represented by a corresponding window in display 116. Thus, a GUI application 106 is connected to X Server 101 and represented in display 116 by corresponding window 106W. Window 106W provides a mechanism by which a user of terminal 110 can exchange information with GUI application 106. Similarly, a GUI application 206 residing on remote host 202 is connected to X Server 101. Non-GUI applications, such as non-GUI applications 104, 204, and 209, are connected to X Server 101 through intermediate GUI terminal emulators 105, 108, and 208 respectively. Each of these terminal emulator provides a graphical interface to is corresponding non-GUI application. In the case of a non-GUI application resident on local host 102, the emulator typically resides on local host 102 as well. In the case of non-GUI applications residing on remote host 202, the emulator may reside on first host 102 or on remote host 202. Each GUI emulator defines and uses a corresponding window in display screen 116. Thus, GUI terminal emulator 105 is connected is associated with window 105W of display 116 and provides a mechanism permitting a user to interact with non-GUI application 104 in a graphical fashion. In the case of a non-GUI application residing on remote host 202, the corresponding terminal emulator that connects the non-GUI application with X Server 101 may reside on local host 102 or on remote host 202 as exemplified by GUI terminal emulator 108 and GUI terminal emulator 208 in FIG. 1 respectively.

Typically, a multiple user windowing system such as the X Window System requires that each user have access privileges. In the case of the X Window System, local and remote user access is granted to the end user via xauthorization or, less typically, via xhost or ICE. In the case of xauthority, a machine readable code is generated and placed in a file called "Xauthority" of the user's home directory at login. This code, commonly referred to as the magic cookie, is also told to X Server 101. The magic cookie is comparable to a password known only to X Server 101 and a user who has logged in (although the user does not have to actually type the magic cookie at any point). Once the magic cookie is established for a given X session, a client application must present the code to X Server 101 to connect to the server. The client obtains the code by reading the Xauthority file in the user's home directory. FIG. 1, indicates a disk 120 that includes the Xauthority file. In the depicted embodiment, disk 120 is physically connected to (i.e., resides on) local host 102. A network connection makes the Xauthority file virtually accessible to client applications on remote host 202. The Xauthority file can be read and written only by an owner of the file. Because, however, all processes started by a user inherit that user's permissions, each process invoked by the user will be able to access the Xauthority file of that user and will, therefore, be able to present X Server 101 with the appropriate code and connect to the server. The Xauthority access control mechanism is well known to those knowledgeable in X Window System operation. See, e.g., *X Window System Administrator's Guide*, pp. 77–78.

Although X Server 101 is able to connect to local and remote GUI applications via the Xauthority access mechanism, it is still typically necessary for some additional form of authorization to enable a user of terminal 110 to execute a command on a remote system. Typically, before a user of terminal 110 can access the desktop of remote host 202 to invoke applications 204, 206, or 209, the user must telnet over to (or otherwise log into) remote host 202. The telnet authorization is almost always independent of the X Window System login sequence and thus presents an undesirable additional layer of complexity to achieve interoperability between local host 102 and remote host 202. The present invention contemplates a user from one host on the network executing commands and running applications on another host based on the user's access permission to the X Server (i.e., based on the user's Xauthority authorization). Since Xauthority grants access on a per user and pre session basis using a variety of configurable security identification mechanisms, Xauthority should provide adequate access control over the network. Leveraging this security mechanism to enable remote execution can be achieved with little additional infrastructure.

Referring again to FIG. 1, a client application 107 identified by the name "xthere" installed on local host 102 and connected to X Server 101. In one embodiment, xthere application 107 is a GUI application that may be invoked via X Server 101 by, for example, clicking on an icon on the desktop of local host 102. In other embodiments, xthere application 107 may be implemented as a non-GUI application that is invoked via a terminal emulator or through a command line entry. Also shown in FIG. 1, is an application identified by the name "xhered" 210 installed on remote host 202. In one embodiment, xhered process 210 is an X11 daemon process that cooperates with xthere application 107 to provide a mechanism by which a user of terminal 110 can execute a command on remote 202 after establishing an X Window System session using X Server 101 as an intermediary. With xthere client 107 and xhered process 210, remote execution is enabled without requiring the user to establish a second level of authorization thereby improving the interoperability of network 100.

Figure 2:
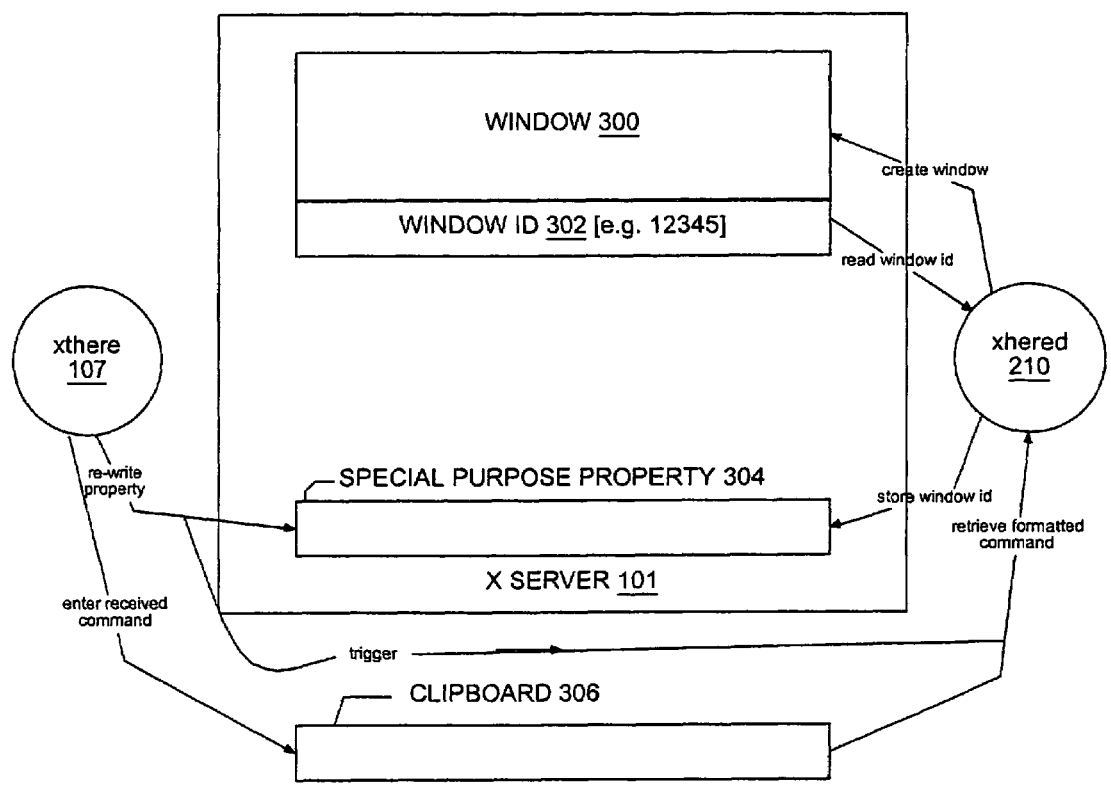
FIG. 2 is a diagram illustrating a mechanism for executing a command string on a remote host.

Referring now to FIG. 2, an illustration of the manner in which xthere client 107 and xhered process 210 cooperate via X Server 101 to execute commands on remote host 202 is depicted. Xhered process 210 may be installed on remote host 202 when the X Window System is initiated. Initially, xhered process 210 established an identify on X Server 101 by, for example, creating a window 300 on X Server 101. X Server 101 assigns a window id 302 (typically an integer number such as 12345) to window 300. Xhered process 210 reads window id 302 and stores window id 302 in a special purpose property referred to herein as COMMAND RENDEZVOUS property 304 of X Server 101. In the X Window System, properties allow the system to associate arbitrary information with specific windows, usually for the purpose of making the data available to a window manager or other applications. For additional information regarding properties, the reader is referred to A. Nye, *Xlib Programming Manual*, 404 et seq., (O'Reilly & Associates 1992). After storing window id 302 in property 304, xhered process 210 enters a spinning or listening mode in which it monitors COMMAND RENDEZVOUS property 304 for a change in value or other alteration. In one embodiment, xhered process 210 monitors alterations to property 304 by watching the X11 events property to determine if any changes have occurred to COMMAND RENDEZVOUS property 304.

When a user wishes to execute a command on remote host 202, the user invokes xthere client 107 through any various means depending upon the specific implementation of xthere process 107. In an embodiment in which xthere application is implemented as a GUI application, the user may invoke xthere client 107 by clicking on xthere icon on the desktop of local host 102. Once activated, xthere client 107 is configured to receive input from the user. In one embodiment, for example, xthere client 107 presents the user with a text box and waits for the user to enter a text string. Upon receiving an input string from the user, xthere client 107 forwards the received string to remote host 202 for execution by xhered process 210. In one embodiment, the user entered string is transferred to remote process by means of a clipboard facility. In the X Window System, each window is associated with a Motif clipboard. Details of Motif clipboards for use in conjunction with an X Window System are available in D. Heller, *Motif Programming Manual*, Chapter 18 (O'Reilly & Associates 1991).

In one embodiment, xthere client 107 retrieves the window id 302 associated with xhered process 210 from COMMAND RENDEZVOUS property 304 and posts the string entered by the user to a Motif clipboard 306 associated with window 300. After posting the text string to clipboard 306, xthere client 107 signals xhered process 210 that a user entered string is available in the clipboard. In one embodiment, xthere client 107 signals xhered process 210 by resetting the value in COMMAND RENDEZVOUS property 304 to a value such as zero. Because xhered process is monitoring for alterations to COMMAND RENDEZVOUS property 304, the resetting of COMMAND RENDEZVOUS property 304 by xthere 107 is used to trigger action by xhered process 210. In one embodiment, xhered process 210 upon detecting an alteration to COMMAND RENDEZVOUS property 304, knows that a string is available in its clipboard 306. In such an embodiment, xhered process 210 is configured to retrieve the user entered string from clipboard 306 upon detecting an alteration or modification of COMMAND RENDEZVOUS property 304.

In one embodiment, the text strings entered by the user are tagged as Bourne shell formatted commands when they are stored in clipboard 306. In this embodiment, xhered process 210, upon detecting an alteration of COMMAND RENDEZVOUS property 304, retrieves string from clipboard 306 and executes the string as a Bourne shell command. The Bourne shell is an interactive command line interpreter that is widely distributed and well known by users of the UNIX® operating system. Thus, in this embodiment, a user of terminal 110 can execute Bourne shell commands on remote host 202 after establishing an X Windows session without telnetting over to or otherwise establishing a secondary connection with remote host 202. After executing the user entered text string, xhered process 210 stores its window id 303 back into COMMAND RENDEZVOUS property 304 of X Server 101 and re-enters its listening mode to await the next alteration initiated by xthere client 107 (i.e., to await the next user enetered command).

Figure 3:
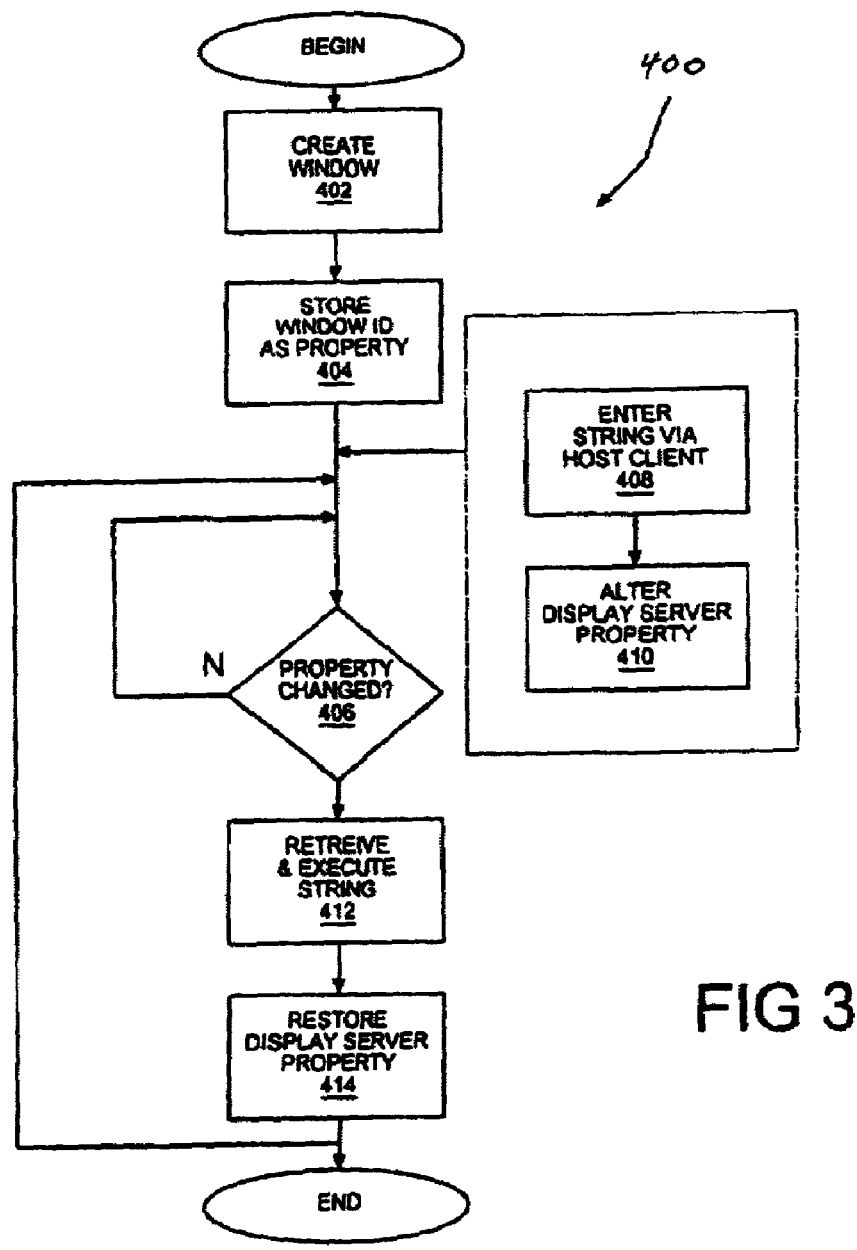
FIG. 3 is a flow diagram illustrating a method of executing a command on a remote host of a data processing network according to one embodiment of the invention.

In one embodiment, various components of data processing network 100 are implemented as computer program products (computer software) that include a sequence of computer executable commands. Thus, X Server 101, xthere client 107, and xhered server 210 (as well as other features of network 100) may all be implemented in software configured to achieve a method of executing commands on remote hosts in a multi-host data processing network. Referring to FIG. 3, a flow diagram illustrating such a method according to one embodiment of the invention is presented. Initially, a first process such as the xhered process 210 creates (step 402) a window on a display server installed on a local host. The window's id is then stored (step 404) as a special purpose display server property. Changes or alterations to the special purpose display server property are then monitored (step 406) by the first process. Asynchronously, a text string formatted as a command string is then entered (step 408) by the user using a client application. In one embodiment, the client application retrieves the special purpose display server property value to identify the destination of the command string and, upon receiving the user entered text string, alters (410) the special purpose display server property to a value such as zero. When the first process detects the alteration to the special purpose display server property, the first process retrieves (step 412) the text string and executes the string as a command on the remote host. After executing the command, the first process restores (step 414) the value of the special purpose property to the first process's window id and resumes listening for subsequent alterations in the value of the special purpose property. In this manner, the first process and the client application cooperatively define a continuous loop in which the first process monitors for and executes commands entered via the client application.

It will be apparent to those skilled in the art having the benefit of this disclosure that the present invention contemplates an elegant solution enabling execution of command strings on remote hosts in a heterogeneous network. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. A multi-host data processing network including a local host and a remote host, comprising:
    a terminal including a display a keyboard, and a pointing device;
    a display server on the local host associated with a user of the terminal, wherein the display server enables the user to execute GUI applications on the local and remote hosts from the terminal via a display server authorization mechanism; and
    wherein the network is configured to enable the user to execute a text string entered at the terminal as a shell command on the remote host via the display server;
    wherein the local host includes a client application and the remote host includes a daemon process, wherein the client application is enabled to receive the text string from the user and the daemon process is configured to retrieve the text string and execute the text string as the shell command;
    wherein the daemon process is configured to monitor changes to a property of the display server, and further wherein the client application is configured to alter the display server property upon receiving the text string.

2. The network of claim 1, wherein the daemon process is configured to open a display server window and to store a window id of the display server window as the display server property and wherein the client application is configured to change the display server property to zero upon receiving the text string.

3. The network of claim 2, wherein the client application is enabled to transfer the text string to a clipboard associated with the display server window and wherein the daemon process is enabled to retrieve the text string from the clipboard upon detecting a change to the display server property.

4. A distributed network windowing system computer program product enabling remote execution in a data processing network including a local host and a remote host, the computer product comprising:
    a display server on the local host, wherein the display server enables a user of a display terminal connected to the network to invoke local and remote GUI applications;
    a client application on the local host connected to the display server and configured to receive a command string and, upon receiving the command string, to paste the command string to a clipboard; and a daemon process on the remote host configured to retrieve the command sting from the clipboard and further configured to execute the command string as a shell command on the remote host.

5. The computer program product of claim 4, wherein the daemon process is configured, upon initiation, to open a display window in the display server and to store an id associated with the display window in a property of the display server.

6. The computer program product of claim 5, wherein the client application is configured, upon receiving the command string, to read the display server property, and to re-set the display server property to zero.

7. The computer program product of claim 6, wherein the daemon process is configured to retrieve the command string from the clipboard responsive to detecting an alteration to the display server property.

8. A method of executing a shell command on a remote host, comprising:

creating a first window with a first process;

storing an id associated with the first window as a property of a display server;

monitoring for alterations in the display server property with the first process;

entering a command string via a client application, wherein, upon receiving the command string, the client application is configured to store the command string in a clipboard associated with the first window and to alter the display server property; and upon detecting the alteration in the display server property, retrieving the command string from the clipboard and executing the command string as a shell command on the remote host.

9. The method of claim 8, wherein the first process resides on the remote host of a multi-host data processing system, the client resides on a local host of the system, and the command string is entered on a terminal connected to the local host.

10. The method of claim 8, wherein the command comprises a command shutting down the remote host.

11. The method of claim 8, wherein the command comprises a command invoking an application residing on the remote host.

12. The method of claim 8, wherein the command string is entered by a user of a terminal controlled by the display server.

13. The method of claim 8, further comprising, prior to creating the first window, logging into a local host of a multi-host computer system, wherein upon logging in, a windowing system initiates the display server and creates an authorization file associated with a user and by which applications connect to the display server.

14. The method of claim 8, wherein the display server enables execution of local and remote GUI applications from a terminal served by the display server.

15. The method of claim 8, wherein the altering of the display server property by the client application comprises the client application writing the display server property to zero.

16. The method of claim 8, wherein the display server comprises an X Server of an X Window System.

17. The computer program product of claim 4, wherein the client application and the daemon host have access privilege to the display server via a common access code associated with the user and wherein the user is enabled to execute the shell command on the remote host based solely on the access privilege to the display server.

* * * * *